United States Patent
Okabayashi et al.

[11] Patent Number: 5,889,924
[45] Date of Patent: *Mar. 30, 1999

[54] INDUSTRIAL ROBOTS CONTROLLER

[75] Inventors: Kazuo Okabayashi; Kouji Sakanashi, both of Kitakyushu, Japan

[73] Assignee: Kabushiki Kaisha Yaskawa Denki, Fukuoka, Japan

[*] Notice: This patent issued on a continued prosecution application filed under 37 CFR 1.53(d), and is subject to the twenty year patent term provisions of 35 U.S.C. 154(a)(2).

[21] Appl. No.: 714,141

[22] PCT Filed: Mar. 22, 1995

[86] PCT No.: PCT/JP95/00524

§ 371 Date: Sep. 16, 1996

§ 102(e) Date: Sep. 16, 1996

[87] PCT Pub. No.: WO95/25991

PCT Pub. Date: Sep. 28, 1995

[30] Foreign Application Priority Data

Mar. 23, 1994 [JP] Japan .................................. 6-078063

[51] Int. Cl.⁶ .................................................. B25J 9/16
[52] U.S. Cl. .................................................. 395/80
[58] Field of Search ........................................ 395/80, 83

[56] References Cited

U.S. PATENT DOCUMENTS

| | | | |
|---|---|---|---|
| 3,890,552 | 6/1975 | Devol | 395/86 |
| 4,258,425 | 3/1981 | Ramsey et al. | 395/83 |
| 4,495,588 | 1/1985 | Nio et al. | 395/86 |
| 4,503,507 | 3/1985 | Takeda et al. | 395/83 |
| 4,628,435 | 12/1986 | Tashiro et al. | 364/130 |
| 4,633,385 | 12/1986 | Murata et al. | 395/83 |
| 4,837,734 | 6/1989 | Ishikawa et al. | 395/84 |
| 4,853,874 | 8/1989 | Iwamoto et al. | 395/84 |
| 4,891,765 | 1/1990 | Hatori et al. | 395/83 |
| 4,998,050 | 3/1991 | Nishiyama et al. | 395/83 |
| 5,041,991 | 8/1991 | Fujiki | 395/83 |
| 5,161,101 | 11/1992 | Mishiyama et al. | 395/88 |
| 5,204,942 | 4/1993 | Otera et al. | 395/83 |
| 5,254,923 | 10/1993 | Kanitani | 901/8 |
| 5,341,458 | 8/1994 | Kaneko et al. | 395/80 |
| 5,371,836 | 12/1994 | Mitomi et al. | 395/87 |
| 5,404,290 | 4/1995 | Tsuchihashi et al. | 395/99 |

FOREIGN PATENT DOCUMENTS

| | | |
|---|---|---|
| 58-120480 | 7/1983 | Japan . |
| 62-106511 | 5/1987 | Japan . |
| 63-48205 | 4/1988 | Japan . |
| 63-216689 | 9/1988 | Japan . |
| 1274977 | 11/1989 | Japan . |
| 4-129645 | 4/1992 | Japan . |
| 4-252304 | 9/1992 | Japan . |

*Primary Examiner*—Tariq R. Hafiz
*Attorney, Agent, or Firm*—Jordan and Hamburg LLP

[57] ABSTRACT

A controller provides effective control of a plurality of control objects performing various cooperative and competitive jobs. The controller includes a first system execution section for storing a set of commands which describe the operation of a plurality of control objects as a first cooperative job and for executing the commands. A second system execution section is also provided for storing additional commands describing the operation of at least one control object other that the plurality of control objects governed by the first execution system and for executing the additional commands. A third system execution section which is included in the controller permits storage of activation commands for activating the first and second system execution sections and allows asynchronous and simultaneous execution of the commands stored in each. The first and second system execution sections have a master/slave relation with one another, one operating as a slave and a remaining one, as a master. The system execution section which operates as the slave utilizes output of the master as a reference to correct execution of the stored commands of its own.

6 Claims, 6 Drawing Sheets

INDUSTRIAL ROBOTS CONTROLLER

BACKGROUND OF THE INVENTION

The present invention relates to a controller for industrial robots and more particularly to a machine controller which is applicable when a control object (a mechanism comprising a robot(s) and one or a plurality of external axes) is commonly used for performing a plurality of jobs.

As disclosed in Japanese Unexamined Patent Publication No. Hei 4-252304, a known method exists for controlling a robot and a turntable comprising a plurality of axes and, as disclosed in Japanese Unexamined Patent Publication No. Sho 63-216689, it also causes a cooperative operation to be performed by a single robot and a plurality of positioners.

Further, as shown in FIG. 1, there exists a method by which three control objects (two robots (B) and (C) and a single station (A) comprising a plurality of axes) are controlled by a single controller. In this case, all the control objects (A) - (B) - (C) are controlled synchronously with one another or in such a manner that a cooperative operation is first performed between (A) and (B) and after that, a cooperative operation is performed between (A) and (C).

However, where all the control objects (A) - (B) - (C) are synchronously controlled, since the control objects are controlled in a simultaneous start/stop mode, they can not be controlled individually at separate speeds. Further, where a cooperative operation is performed between (A) and (C) after the completion of a cooperative operation between (A) and (B), the control object (C) can work independently during the cooperative operation between (A) and (B) and the control object (B) can work independently during the cooperative operation between (A) and (C). However, a problem exists in that control objects (C) or (B) cannot both perform a cooperative operation with (A) at the same time, thus lowering working efficiency.

SUMMARY OF THE INVENTION

Accordingly, the present invention has been developed to eliminate the above problem, and an object of the present invention is to provide a machine controller which is capable of controlling a machine asynchronously and simultaneously even when control objects compete in a plurality of jobs.

In order to solve the above problem, the present invention provides a machine controller for controlling a plurality of control objects such as robots, external axes and etc. The machine controller is characterized by the provision of:

a first system execution means for storing a command describing operation of a plurality of control objects as a first cooperative job and for executing it;

a second system execution means for storing a command describing operation of any one of the plurality of control objects and operation of at least one control object other than the plurality of control objects governed by the first system execution means as a second cooperative job and for executing it; and a third system execution means for storing commands for starting the first system execution means and the second system execution means and for executing them asynchronously and simultaneously.

It should be noted in this connection that the third system execution means is a specific system execution means governing the starting of the first and second system execution means, and has the function of regulating the master/slave relationship between the first and second system execution means. The execution system designated as the slave corrects its own command by referring to the output of the other as the master.

DETAILED DESCRIPTION OF THE INVENTION

One embodiment of the present invention will now be described with reference to the accompanying drawings.

Figure 1:
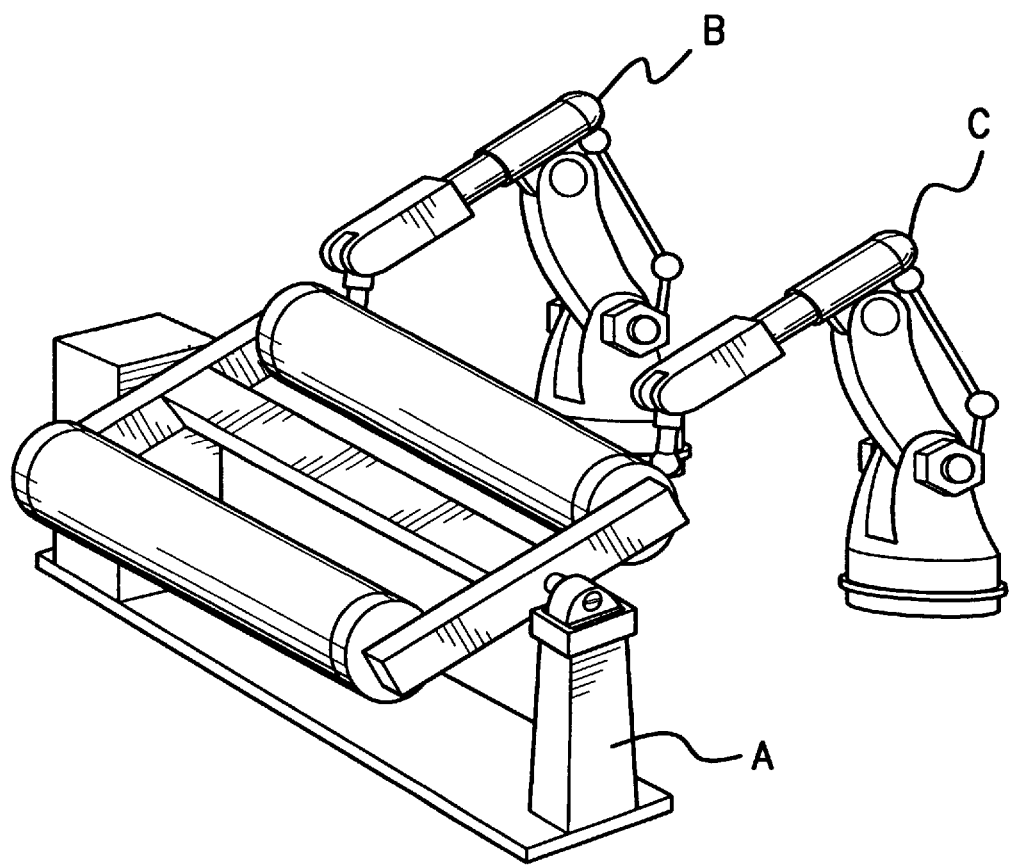
FIG. 1 is a perspective view of a system to which the present invention is applicable.
Figure 2:
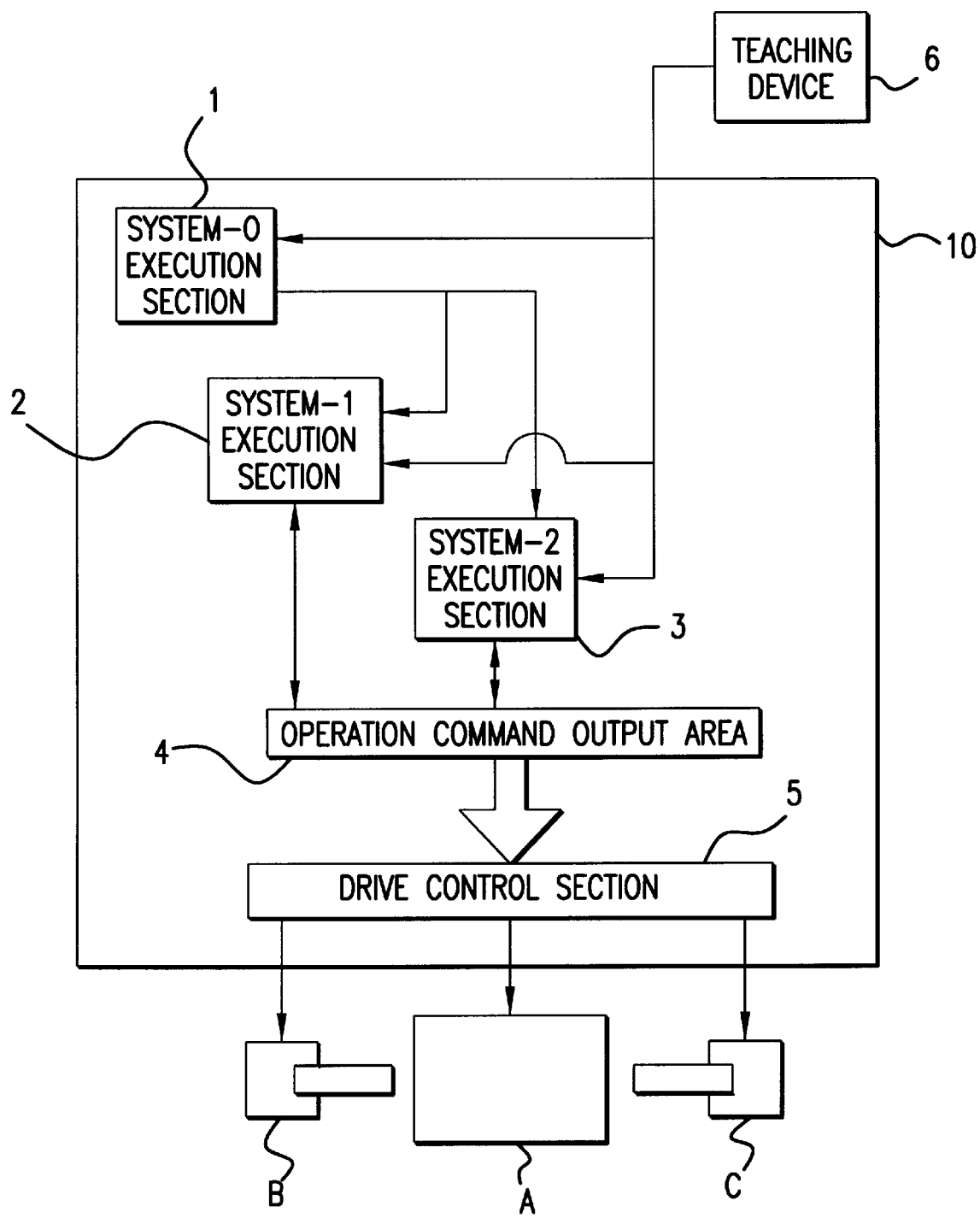
FIG. 2 is a conceptual diagram illustrating one embodiment of the present invention.

FIG. 2 shows one embodiment of the present invention wherein a machine controller 10 comprises three system execution sections including a system-0 execution section 1, a system-1 execution section 2 and a system-2 execution section 3, an operation command output area 4 and a drive control section 5.

Each of the system execution sections is taught by a teaching device 6 to interpret and execute stored commands, and generates an operation command prepared thereby to the operation command output area 4. When the operation commands are ready, they are simultaneously given so that a plurality of control objects can be driven.

These execution systems become executable asynchronously with one another in a multitask mode. The term "system" means a job and one job is a command row with respect to a set of at least two machines.

However, system-0 differs from the remaining systems in that it governs only commands to the other systems. In the present application, the job done by system-0 is called a "master job" and the job governing the actual operation is called a "subjob". In the present invention, the controller 10 is provided with a single system-0 execution section and two or more system execution sections 2 and 3 governing actual operations. Further, as will be described later, the above-mentioned two or more system execution sections effecting actual operations are classified into a main system execution section and other dependent system execution sections.

It should be noted that jobs between the systems are executed asynchronously, but a plurality of control objects governed by systems other than system-0 are controlled synchronously with one another within the systems. Accordingly, the job to be governed by each of the systems may be called a cooperative job.

Figure 3:
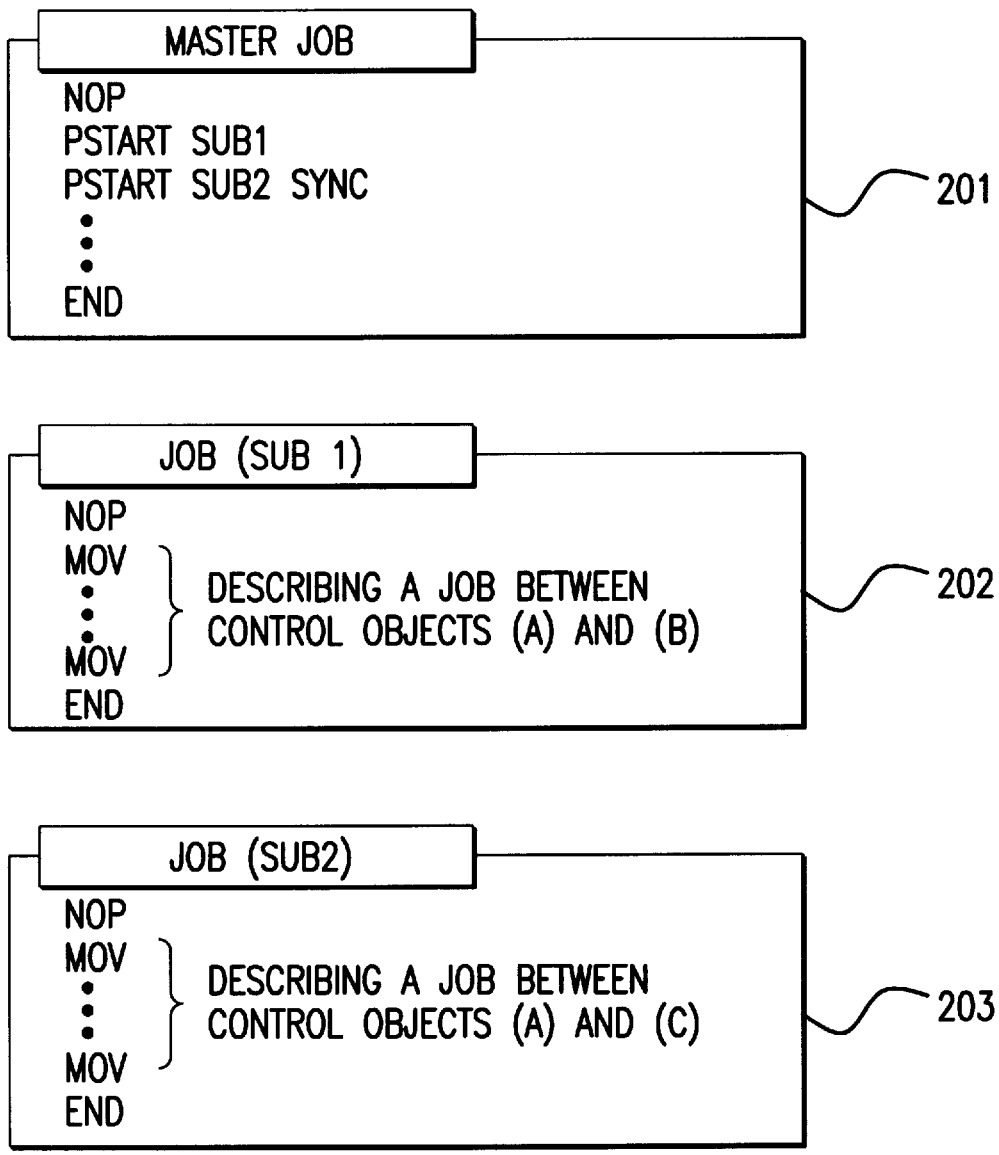
FIG. 3 is an illustration of the operation of a machine controller according to the present invention.

The operation of the controller according to the present invention will be described by taking, as an example, a case in which a job shown in FIG. 3 is executed.

Reference numeral 201 designates a master job to be executed by the system-0 execution section, reference numeral 202 designates a subjob (SUB1) to be executed by the system 1 execution section so as to drive control objects (A) and (B), and reference numeral 203 designates a subjob (SUB2) to be executed by the system-2 execution section so as to drive control objects (A) and (C). That is, subjobs 1 and 2 have control object (A) in common. In the instant example, control objects (B) and (C) are welding robots and control object (A) is a station (i.e., work positioner). The essential nature of the present invention, however, has nothing at all to do with what the control objects (A), (B) and (C) actually are.

Upon reception of a second line command, master job 201 causes the system-1 execution section to start (PSTART) to execute the subjob (SUB 1). Similarly, upon reception of a third line command, master job 201 causes the system-2 execution section to start (PSTART) to execute the subjob (SUB 2), but in this case, the attachment of the indication [SYNC] to the command indicates that control of a control object is doubled with the result that the job attached with the indication [SYNC] becomes a slave and the job without the indication [SYNC] becomes a master. Where there are three or more jobs, only one of them is without the indication [SYNC] with all the remaining jobs being attached with the indication [SYNC].

In the case of system-1, since operations with respect to control objects (A) and (B) are already taught, the system-1 execution section interprets and executes commands relating thereto so that the operation commands for control objects (A) and (B) are written in operation command output area 4. Similarly, in the case of system-2, the system-2 execution section interprets and executes the commands relating thereto, but since system-2 is instructed by system-0 by means of the indication SYNC (i.e., dependent on the series 1), it calculates a difference between operation command output data (which is temporarily stored in the operation command output area 4 for reference) prepared by the system-1 and teaching data (which is taught by the teaching device 6 and stored) with respect to control object (A) which is also governed by system-1, prepares operation command output data for control object (C) to compensate for the difference calculated, and writes the prepared data in the operation command output area.

The reason why the operation command output data is prepared is because, as the operating locus (i.e., the welding line of the robot) of control object (C) deviates due to the rotation of the station of control object (A), it is necessary to correct for the amount of deviation.

Thus, when the operation command output data for all control objects has been prepared, the data is actually outputted to the servo system.

That is, the main system executes its own control operation without any regard for the other systems, but each of the dependent series refers to the operation command output data from the main system and corrects its own operation command affected thereby every control cycle. Thus, all commands with respect to the axes of all control objects are put together to be passed to drive control section 5 so that the operation of any system designated as a dependent (or slave) system is not delayed with respect to the main system.

Next, a teaching method in the example shown in FIG. 3 will be described.

(1) To teach a cooperative job (SUB 1) between robot B and station A.

(2) To register a cooperative job (SUB 2) between robot C and station A (To temporarily register only the title without any concrete teaching).

(3) To prepare and register the master job.

(4) To cause the master job to perform a next operation (to cause the master job to operate step by step for operation confirmation). To cause two PSTART commands to be executed to start SUB 1 and SUB 2.

(5) To make the operating object for SUB 1 (on the premise that the designation of the job desired can be made through the key switch ((not shown)) of the teaching device), to cause robot B to move to step 1 (the first teaching point) and to determine the position of station A.

(6) To switch the operating object to SUB 2 and to teach step 1 (the first teaching point) of robot C with respect to SUB 1.

(7) Even after step 2 (the second teaching point) downward, to teach steps in the order of the above paragraphs (5) and (6).

As described above, since the designation and switching of the job desired can be made through the key switch of display device 6, the position determined in a certain job can be made use of for the preparation and addition of other jobs in a simple manner.

Figure 4:
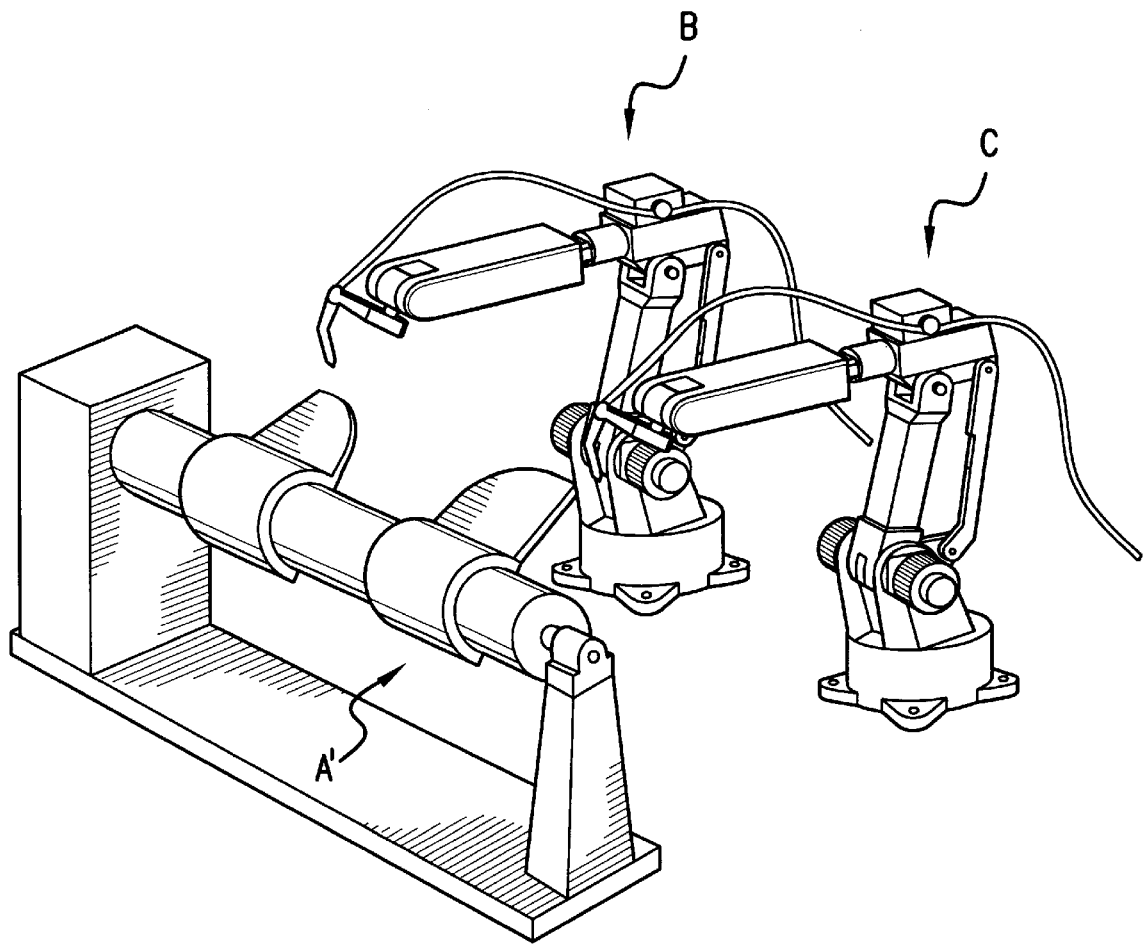
FIG. 4 is a view showing an example of a job of bilateral symmetry.

In addition, where the work is bisymmetrical (refering to FIG. 4), it is possible to prepare a cooperative job (SUB 2) between robot C and station A' as described below after teaching the cooperative job (SUB 1) between robot B and station A'.

This can be realized in such a manner that when one operation is taught as a first cooperative job and one or operation of more control objects other than control objects governed by the above-mentioned first cooperative job is produced as a second cooperative job, a conversion means is additionally provided in controller 10 so that the position data of the one or more control objects other than the control objects governed by the first cooperative job is converted to become bisymmetrical on the basis of the position data of the control objects governed by the first cooperative job.

Figure 5A:
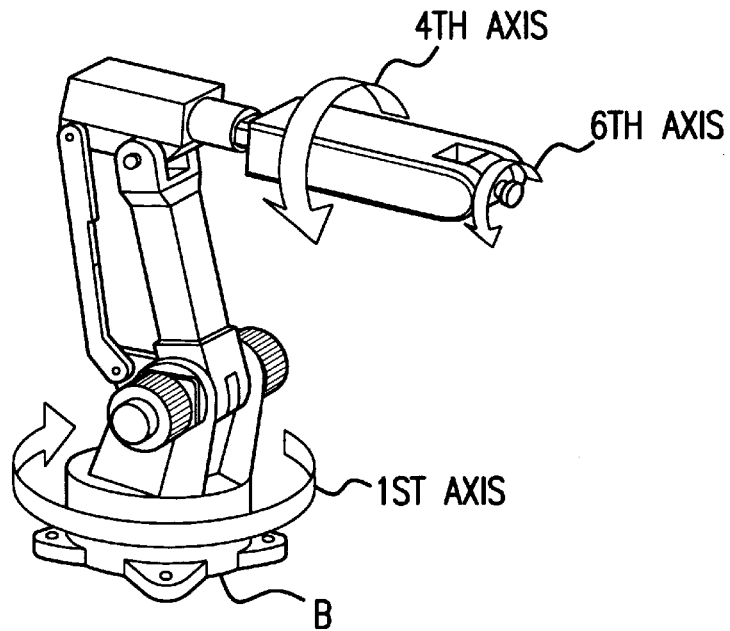
FIG. 5 is an illustration of a position data reversing axis where a job according to the present invention is bisymmetrical.
Figure 5B:
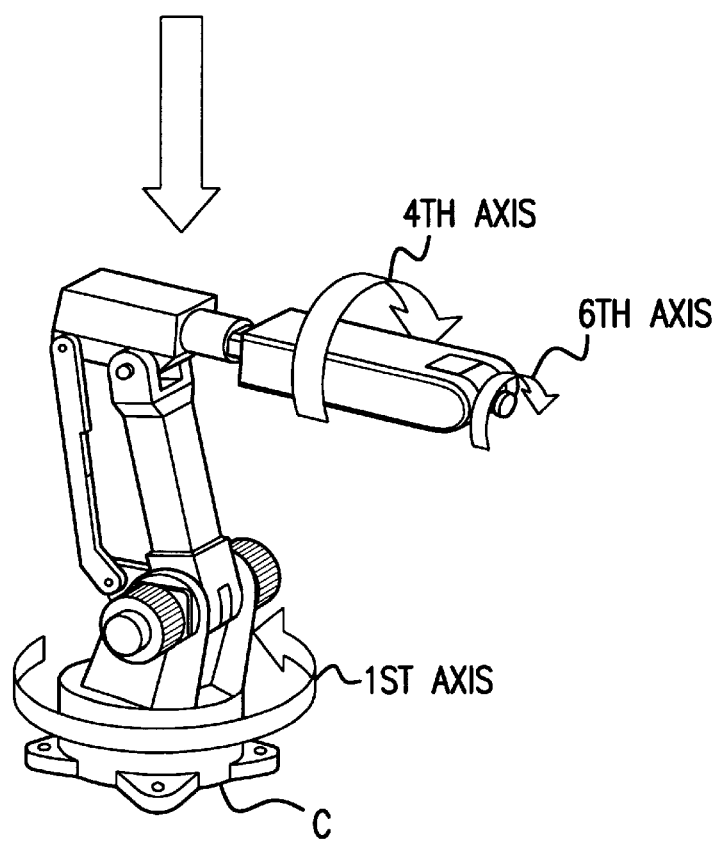
Figure 6:
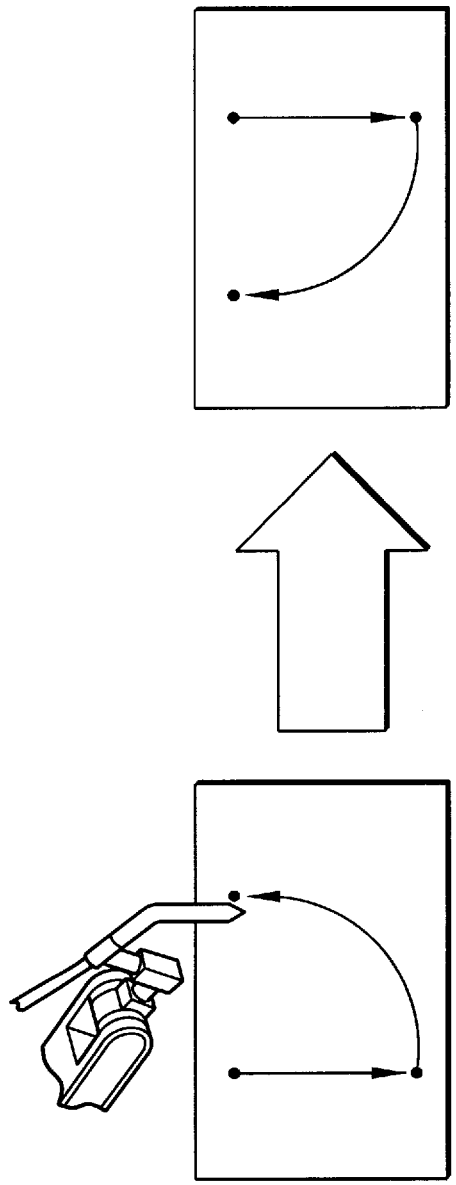
FIG. 6 is an illustration of an operation when the job is bisymmetrical.

Practically, the work job stored in the series 1 execution section is read out. Where the work is bisymmetrical, the rotational directions (indicated by arrows) of specific axes determined by the robot mechanism (in the case of the robots in the instant embodiment, the first, fourth and sixth axes as shown in FIG. 5) are reversed to generate position data to thereby make the job for the system-2 execution section. As a result, the operation will be as illustrated in FIG. 6.

Where the work is the same on both right and left sides, mere copying of the job stored in the system-1 execution section can of course serve the purpose.

As described above, according to the present invention, even when control objects are overlapping, they can be controlled simultaneously and asynchronously so that working efficiency can be improved. Further, the teaching regarding subjobs is quite the same as in the conventional system and it is only the regulation of the master/slave relationship in master jobs. For this reason, the simple alteration of the master/slave relationship after teaching provides an extremely high degree of practicality.

The present invention applies to a case where a plurality of robots perform a welding operation in cooperation with one another.

We claim:

1. A machine controller for controlling control objects, comprising:

a first system execution means for storing first commands describing operations of at least two control objects, of said control objects for a first cooperative job and for effecting execution of said first commands of said first cooperative job;

a second system execution means for storing second commands describing operations of a first control object of said at least two control objects governed by said first system execution means and at least one other control object, of said control objects and other than said at least two control objects, for a second cooperative job and for effecting execution of said second commands of said second cooperative job;

a third system execution means for storing third commands for starting said first system execution means effecting execution of said first commands and said second system execution means effecting execution of said second commands, and for effecting execution of said third commands asynchronously and simultaneously;

said first and second system execution means having a master-slave relation with one another wherein one of said first and second system execution means operates as a slave and another one of said first and second system execution means operates as a master; and said one of said first and second system execution means operating as said slave using an output of said another one of said first and second system execution means as a reference to correct execution of a respective one of said first and second commands stored by said one of said first and second system execution means.

2. The machine controller according to claim 1, further comprising: a conversion means for effecting bisymmetrical operations of said control objects, wherein a first operation of said bisymmetrical operations is the first cooperative job, a second operation of said bisymmetrical operations is said second cooperative job, and said first cooperative job includes first position data for at least a second control object of said at least two control objects governed by said first system execution means; and said conversion means including means for converting said first position data into position data for effecting operation of said at least one other control object for said second cooperative job that is bisymmetrical to operation of said at least a second control object of said first cooperative job.

3. The machine controller according to claim 1, further comprising an operation command output memory for temporarily storing an operation command outputted from at least one of said first, second and third system execution means.

4. The machine controller according to claim 3, wherein said master/slave relation is designated by said third system execution means.

5. The machine controller according to claim 4, wherein said another one of said first and second system execution means operating as said master stores operation commands in said operation command output memory and said one of said first and second system execution means operating as said slave reads said operation commands stored in said operation command area by said another one of said first and second system execution means to effect said correction of said respective one of said first and second commands to compensate for movement of said first control object effected by said operation commands stored in said operation command area by said another one of said first and second system execution means.

6. A machine controller according to claim 5 wherein a means capable of designating and switching an operation object job for preparing and editing said cooperative job is provided so that a position designated by a certain cooperative job can be used for the preparation and addition of any other job.

* * * * *